Dec. 25, 1951   O. C. NIEDERER ET AL   2,579,604
EGG CLEANING DEVICE
Filed April 19, 1950                    3 Sheets-Sheet 2

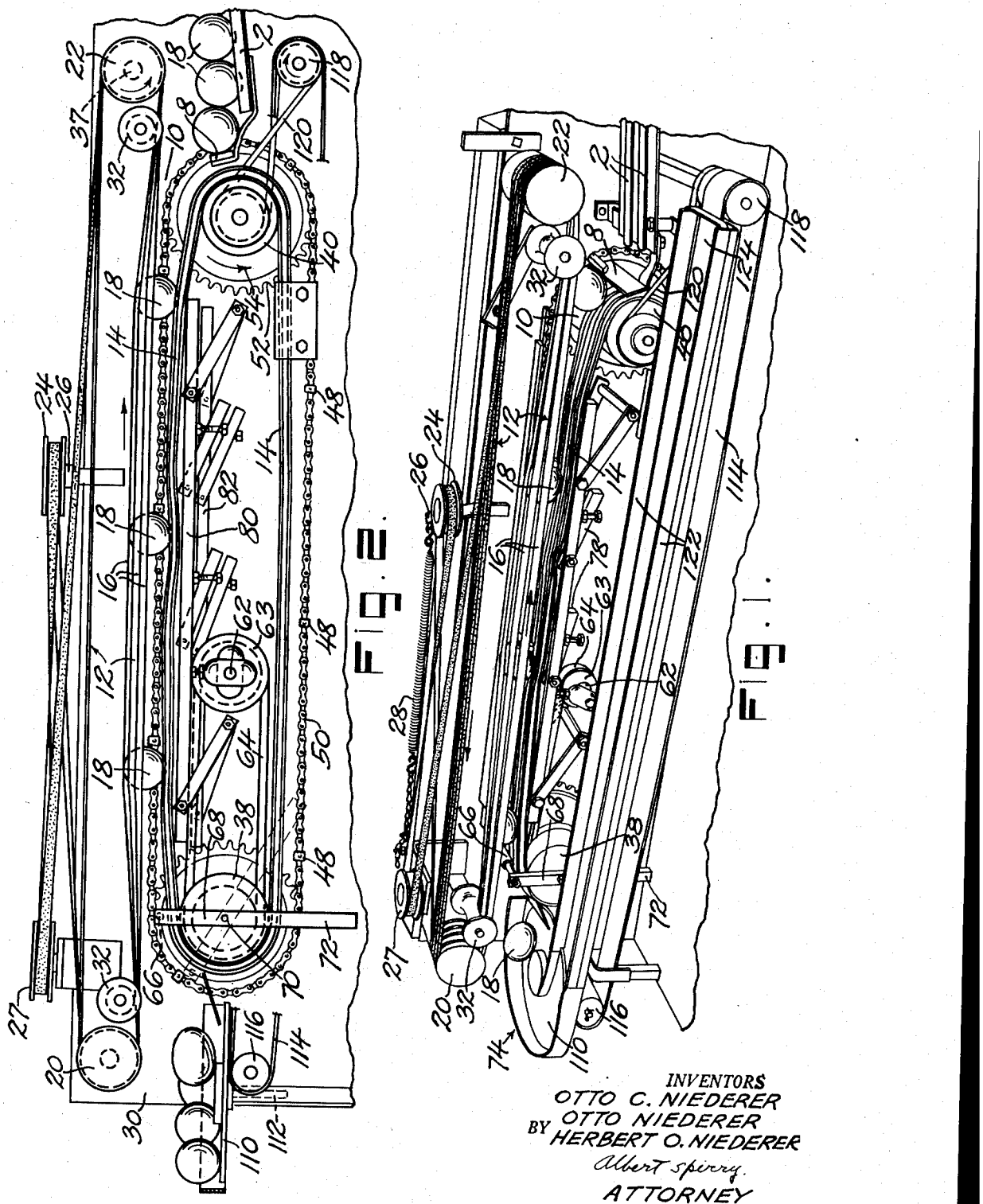

INVENTORS
OTTO C. NIEDERER
OTTO NIEDERER
BY HERBERT O. NIEDERER
Albert T. Sperry
ATTORNEY

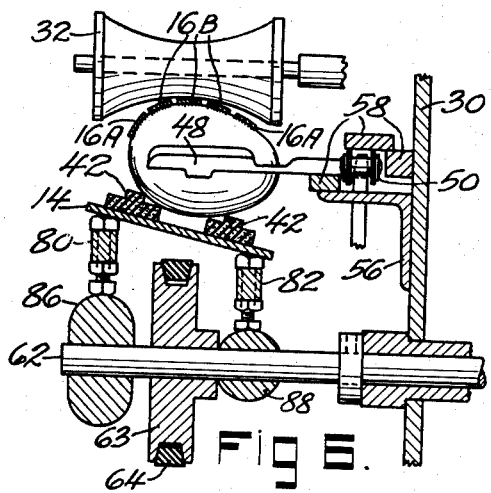
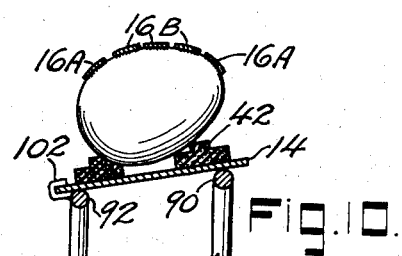
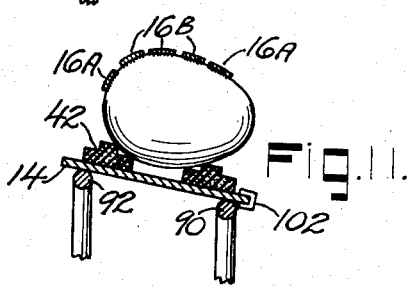
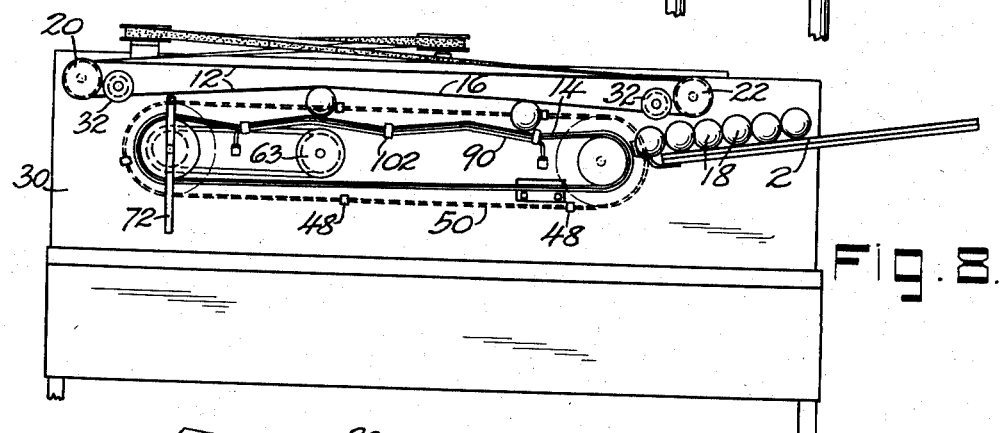
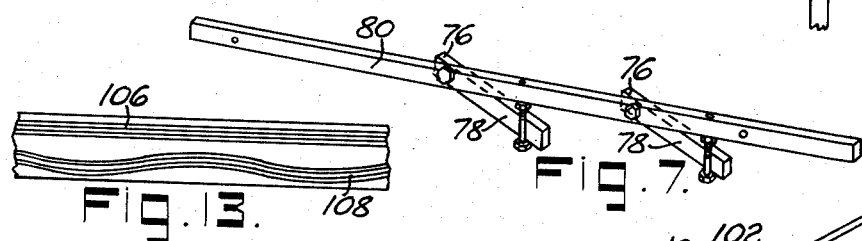
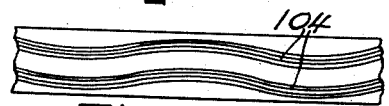
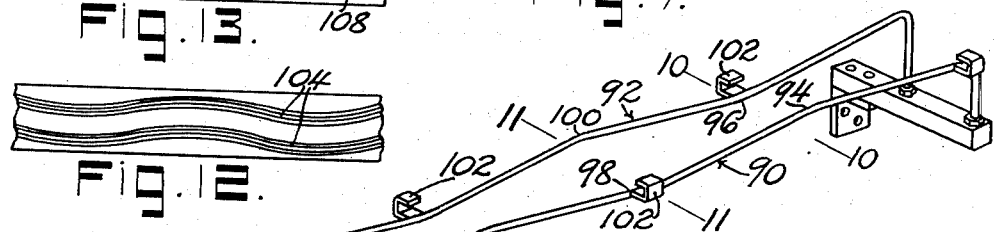
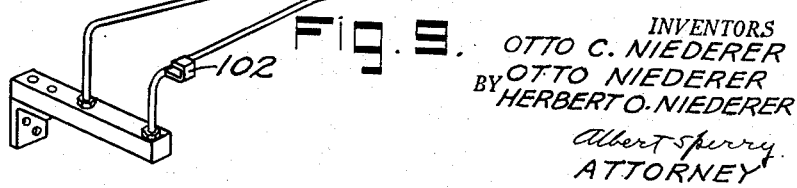

Patented Dec. 25, 1951

2,579,604

UNITED STATES PATENT OFFICE 2,579,604

EGG CLEANING DEVICE

Otto C. Niederer, Otto Niederer, and Herbert O. Niederer, Titusville, N. J.

Application April 19, 1950, Serial No. 156,818

6 Claims. (Cl. 51—138)

1

This invention relates to egg cleaning devices and is directed particularly to modifications and improvements in the type of egg cleaner described and shown in our co-pending application Serial No. 77,096 filed February 18, 1949, as a continuation of our application Serial No. 683,721 filed July 15, 1946, now abandoned.

The constructions shown in said applications include spaced abrasive means and egg supports between which the eggs to be cleaned are passed. The egg supports are shown as being in the form of parallel members which are engaged by opposite ends of the eggs and are movable vertically to tilt the eggs as they are moved over the supports. In this way an egg of normal size is caused to make three or four complete rotations during its passage through the equipment and the ends of the eggs are presented repeatedly to the abrasive means.

In accordance with the present invention the eggs being cleaned are caused to move and to rotate more rapidly in traveling through the device and as a result the eggs are given faster and more uniform cleaning. Furthermore, the present construction permits the eggs to be placed closer together as they travel through the device even though the eggs vary considerably in size. The device herein shown and described is also, simpler and less expensive to produce than that shown in our co-pending application and therefore meets the needs of the small farmer or egg producer as well as large egg handling organizations.

These advantages of the present invention are preferably attained by providing the device with egg supporting means in the form of a traveling bed or belt by which the eggs are rotated as they advance through the equipment in contact with the abrasive means. The abrasive means preferably are shaped to contact the ends of the eggs more effectively and are caused to travel in the same direction but at a higher speed than the surfaces of the eggs which they engage so as to have a gentle but effective cleaning action. In one form of the invention illustrated the eggs after being cleaned are carried back toward the feeding end of the equipment so that a single operator may candle the eggs and feed them to the cleaner and may thereafter remove the cleaned eggs to place them in crates or cartons while standing in one location.

One of the objects of the present invention is to provide an improved form of egg cleaning device wherein the eggs to be cleaned are subjected to gentle abrading action.

2

Another object of the invention is to provide egg cleaning means which serve to move and rotate the eggs relatively rapidly as they pass through the device.

A further object of the invention is to effect more uniform cleaning of eggs by the action of abrading means.

These and other objects and features of the present invention will appear from the following description thereof in which reference is made to the figures of the accompanying drawings.

In the drawings:

Fig. 1 is a perspective of a typical form of egg cleaning mechanism embodying the present invention;

Fig. 2 is a front elevation of that form of the invention shown in Fig. 1;

Fig. 6 is an enlarged sectional view through a portion of the mechanism shown in Fig. 1;

Fig. 7 is an enlarged front elevation of a portion of the construction in Fig. 1;

Fig. 8 is a front elevation of an alternative construction embodying our invention;

Fig. 9 is a perspective of a portion of the construction shown in Fig. 8;

Figure 3:
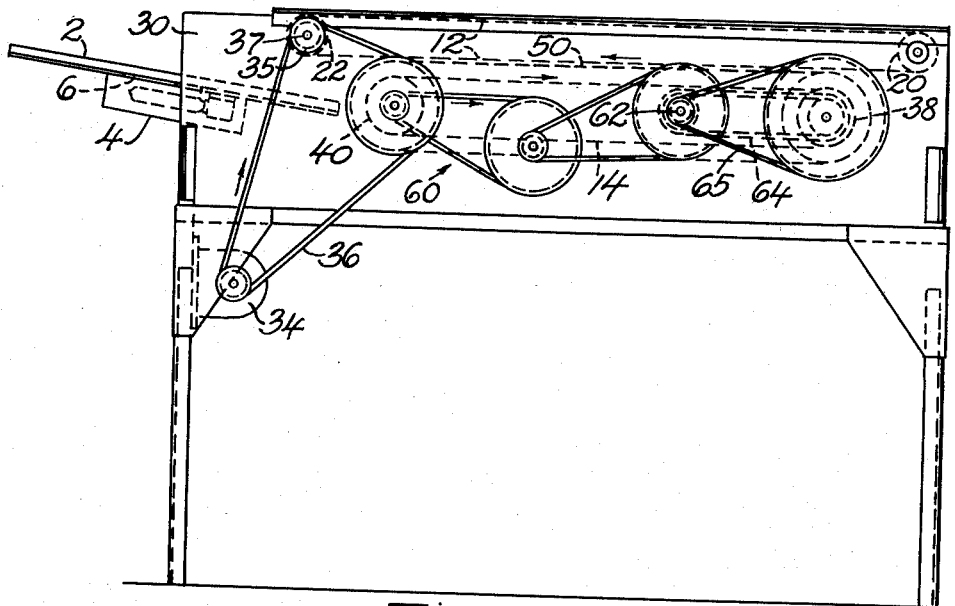
Fig. 3 is a rear elevation of the construction illustrated in Fig. 1.

Figs. 10 and 11 are sectional views through the construction shown in Fig. 9 taken on the lines 10—10 and 11—11 respectively but enlarged and showing additional elements, and Figs. 12 and 13 are top plan views of alternative forms of egg supporting and conveying belts adapted for use in the present invention.

In that form of the invention illustrated in Figs. 1 to 7 the device is provided with egg feeding means shown as a pair of parallel and inclined tracks 2 which extend over a light containing box 4 having a slot 6 located midway between the tracks so that the eggs may be candled as they are fed to the cleaning device. A stationary stop member 8 is located adjacent the lower ends of the tracks 2 in position to hold the eggs in place so that they may be removed one at a time and passed into the egg receiving space 10 between the flexible abrading means 12 and the egg supporting and conveying belt 14.

Figure 4:
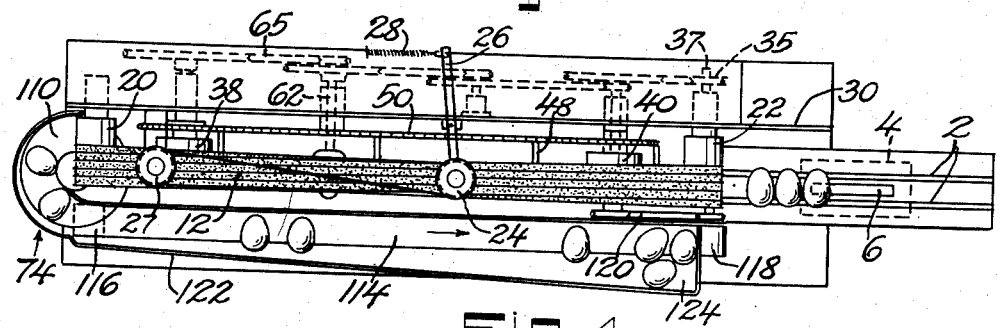
Fig. 4 is a top plan view of the construction of Fig. 1.
Figure 5:
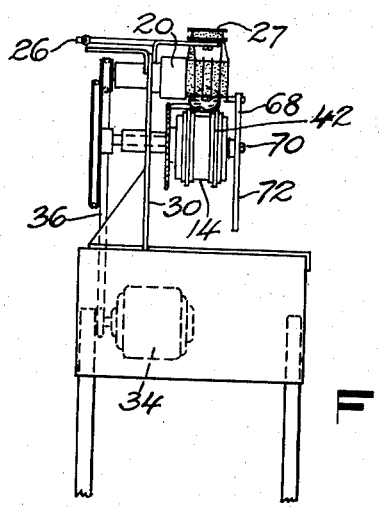
Fig. 5 is an end view of the construction of Fig. 1.

The abrasive means preferably consists of a plurality of substantially parallel strands of tape having abrasive material on the lower face of the lower runs 16 of the tape in position to engage the eggs 18 supported on the belt 14. As shown, the tapes are relatively narrow and five strands are in position to engage each of the eggs as they pass through the device. Any number of strands of tape may be used but they preferably are constructed and arranged as shown and described in our co-pending application Serial No. 77,096 filed February 18, 1949, wherein the strands are in the form of successive portions of a single continuous tape extending in a series of loops about the pulleys 20 and 22 with the strand adjacent the upper edge of the pulley 20 as seen in Fig. 4 extending about a roller 24 mounted on the pivoted arm 26. From the roller 24 the strand extends about the roller 27 and back to the upper side of the pulley 22. Tensioning means are applied to the pivoted arm 26 to place a uniform and predetermined tension on all of the strands of abrasive material engaging the eggs. For this purpose, the spring 28 is connected at one end to the arm 26 and the opposite end of the spring is connected to the housing 30 or to any other fixed point on the device.

The lower runs 16 of the strands of abrasive material pass beneath the concave rollers 32 located adjacent and between the pulleys 20 and 22 so that as shown in Fig. 6 the strands 16A above the opposite edges of the egg conveyor and supporting belt 14 are positioned closer to the belt than are the intermediate strands 16B of abrasive material. In this way the strands are positioned to engage the ends of the eggs more effectively and they further serve to prevent lateral displacement of the eggs with respect to the belt 14 as they turn and rotate in passing lengthwise of the device. The strands are driven by the motor 34 and belt 36 which passes about a pulley 35 on the shaft 37 to which pulley 22 is secured. The direction and speed of rotation of the pulley 22 is such as to cause the strands 16 on the lower run of the abrasive means to travel at a relatively high speed from the discharge end of the device toward the egg feeding means as indicated by the arrow in Fig. 2.

The egg supporting and conveying belt 14 passes about the rollers 38 and 40 and presents an upper egg supporting surface which is spaced from the lower strands 16 a distance somewhat less than the diameter of the eggs to be cleaned. The upper run of the belt 14 travels from the inlet end toward the discharge end of the device in a direction opposite to that in which the downwardly facing strands 16 of the abrasive material travel. Parallel, soft, yieldable tracks 42 formed of sponge rubber or similar material are preferably arranged on the face of the belt 14 for supporting and guiding the eggs as they move through the egg receiving space 10.

Egg engaging and pushing members 48 are carried by a chain 50 and are spaced apart longitudinally of the chain. The members 48 project horizontally from the chain and when the chain passes about the sprocket 52 in the direction of the arrow 54 each egg engaging member in turn passes upward between the stop member 8 and the lower ends of the tracks 2 so as to lift the foremost egg from the tracks and carry it upward over the stop member and into the egg receiving space 10 between the belt 14 and the abrasive means 12. The upper run of the chain 50 is supported by the longitudinally extending bracket 56 mounted on the upper wall of the housing 30 and is held against lateral displacement by the chain guides 58.

The belt 14 is driven from motor 34 through a series of belts and pulleys indicated at 60 which serve as speed reducing means and cause shaft 62 to rotate at a predetermined speed. Pulley 63 is secured to the shaft 62 and is connected by belt 64 to the roller 38 as shown in Figs. 2 and 3 to move the upper egg conveying and supporting belt 14 from the inlet end to the discharge end of the device. Sprocket 52 which drives chain 50 is itself driven from shaft 62 by belt 65 as shown in Fig. 3 so as to cause the egg engaging members 48 to move lengthwise of the device from the inlet end toward the discharge end but at a slower speed than the egg conveying and supporting belt 14.

With this construction each egg in turn is removed from the tracks 2 of the egg feeding device to be acted upon by the egg cleaning means whereupon the remaining eggs on the tracks 2 roll forward so that a following egg engaging member will raise the next egg and carry it into egg cleaning space 10. In this way the eggs are transferred successively from the egg feeding means to the egg cleaning device and are caused to travel one after another through the space between the egg supporting belt 14 of the strands of abrasive material 16. At the discharge end of the device the eggs being advanced by the egg engaging members 48 move out of contact with the abrasive means and into engagement with a discharge member which, as shown, is in the form of a rod 66 extending horizontally above that portion of the egg supporting belt 14 which passes above the roller 38. The discharge member 66 is carried by an arm 68 pivotally mounted at 70 on the frame of the device and the opposite end of the arm is provided with a weight 72 so that when an egg engages the discharge member it will cause the arm 68 to tilt slowly and lower the egg gradually onto the egg receiving means 74.

With this construction movement of the egg supporting belt 14 is in a direction opposite to that of the downwardly facing strands 16 of the abrasive means. The eggs therefore are caused to rotate in a clockwise direction as seen in Fig. 2 and in a typical construction each egg will rotate from about 18 to 22 times in traveling six feet from the inlet end to the outlet end of the device. Furthermore, the direction of movement of the upper portion of the eggs engaged by the abrasive strands is the same as the direction of movement of the strands themselves although at a slower rate. The action of the abrasive means on the shell of the eggs is therefore relatively gentle and in the nature of a mild brushing contact which prevents injury to the eggs even though the shell may be relatively rough, thin or checked.

In order to permit the eggs to be positioned relatively close together as they travel through the egg receiving space 10, it is preferable to employ a belt 14 formed of flexible material such as canvas or the like and means are located below the belt for yieldably urging the belt upward toward the abrasive means. With this construction a small egg is brought into engagement with the abrasive means even though it is preceded or followed by a relatively large egg. As shown in Fig. 7 the belt is thus urged upward by members 76 which extend transversely beneath the belt 14 and are carried by pivoted arms 78. The opposite ends of arms 78 are weighted so as to raise members 76 and lift the belt upward sufficiently to cause the eggs thereon to engage the abrasive means even though they vary considerably in size.

In order to insure cleaning of the opposite end portions of the eggs, the belt 14 is tilted transversely first in one direction and then in the other as it travels lengthwise of the device. In this way one edge of the belt is raised while the upper edge is lowered and as the belt advances the edge which was previously raised is lowered and the opposite edge is raised. The eggs supported by the belt are thus caused to tilt or oscillate from side to side as they move lengthwise of the device and as they rotate in contact with the belt and abrasive means. This tilting of the eggs as they travel lengthwise of the device can be repeated any desired number of times to insure thorough cleaning of the ends of the eggs as well as the sides thereof. Furthermore, the shaped positioning of the strand of abrasive material 16A and 16B resulting from the use of the concave rollers 32 aids in providing effective contact between the abrasive means and the ends of the eggs as they are tilted.

As shown most clearly in Figs. 2 and 6, the means provided for raising and lowering the opposite edges of the belt 14 include the longitudinally extending bars 80 and 82 which are positioned beneath the opposite edges of the egg conveying and supporting belt 14. Cam means are provided for raising one of the bars while the other is lowered and for this purpose a shaft 62 is provided with the cam members 86 and 88 which are in the form of elongated pieces having rounded ends with the axis of the cam members extending at right angles to each other. Therefore as the shaft 62 is rotated the bars 80 and 82 are alternately raised and lowered in oppositely timed relation and the whole upper run of the belt 14 is caused to tilt back and forth so that all of the eggs are simultaneously tilted or oscillated in a similar manner as they pass longitudinally through the egg receiving space 10. In a typical installation each bar is raised and lowered 80 times per minute, whereas the eggs travel through the egg cleaning space at the rate of about 90 feet per minute. When the egg cleaning space is six feet long each egg has each end thereof presented to the abrasive material no less than 15 times. Of course, these speeds of movement and travel of the belt and oscillating means can be varied to insure effective and uniform cleaning of the eggs in a single pass through the egg cleaning device.

As illustrated in Figs. 8 to 11 the egg conveying and supporting belt 14 may be caused to tilt or rock back and forth as it travels lengthwise of the device by stationary means consisting of the undulating rails 90 and 92. Thus the rail 90 is formed with an elevated portion 94 opposite to the depressed portions 96 of the rail 92, whereas the rail 90 has depressed portion 98 opposite an elevated portion 100 on the rail 92. Retaining guards 102 are carried by the rails 90 and 92 to hold the conveyor 14 in engagement with the rails as it travels lengthwise thereof. When using this construction the rails or members engaged by the belt remain stationary, whereas the belt is tilted from side to side as one edge thereof is raised in passing over an elevated portion of the rail and opposite edge of the conveyor is lowered in passing over a depressed portion of the rail.

When using either of the forms of belt tilting means described the belt may be provided on its upper face with yieldable tracks which may be either straight and parallel as shown at 42 in Fig. 6 or they may be curved or zig-zagged as shown at 104 in Fig. 12, or one track may be straight and the other curved as shown at 106 and 108 in Fig. 13. When using the forms of rails shown in Figs. 12 and 13 wherein one or both rails are curved, the eggs traveling lengthwise of the device are caused to tilt or rock back and forth as they roll along the rails and even though the egg supporting and conveying belt is itself tilted or oscillated but little or not at all. Thus each egg passing through the device is caused to oscillate to bring each end into engagement with the abrasive means and at the same time the egg rotates as it advances through the device with that portion of the egg in contact with the conveying and supporting belt moving in the direction of the belt and that portion of the egg in contact with the abrasive means moving in the same direction as the abrasive means. A gentle brushing action is thus exerted on the surface of the egg throughout the entire area thereof insuring gentle but effective cleaning of each egg in one travel through the device.

In order to enable a single operator to feed and candle the eggs and to remove them from the egg cleaning device into crates, cartons or other receptacles while standing in one position, means are provided to return the eggs from the discharge end of the cleaning device to the egg feeding end of the device where the operator is located. For this purpose the egg receiving means 74 onto which the eggs are lowered by the discharge means preferably includes a rotating disc 110 freely rotatable about the central pivot 112 mounted on the front of the device. The lower face of disc 110 bears against the upper face of a traveling return belt 114 and is rotated thereby to cause eggs deposited on the disc by the discharge member 66 to be removed and transferred to the return belt. The return belt 114 passes about the rollers 116 and 118 and is driven by belt 120 from the roller 40 to move the eggs received from the disc 110 to a location near the inlet end of the egg cleaning device. Side rails 122 extend lengthwise of the return belt 114 to prevent the eggs from rolling off the return belt and to form an egg accumulating space 124 in a convenient location near the operator.

The number of egg feeding tracks and egg supporting and conveying belts can be multiplied so as to permit two or more series of eggs to be cleaned simultaneously as they pass through the device and the speeds of movement of the various elements as well as their form, construction and arrangement can be varied to permit a large number of eggs to be handled simultaneously. Numerous other changes and modifications may be made in the elements employed in the practice of the present invention and in view thereof it should be understood that the particular embodiments of the invention shown in the drawings and described above are intended to be illustrative only and are not intended to limit the scope of the present invention.

We claim:

1. An egg cleaning device comprising an egg supporting belt, a strand of flexible abrasive means extending generally parallel to and above said belt and spaced therefrom a distance less than the diameter of the eggs to be cleaned, means for moving said belt and strand in opposite directions, and means for moving eggs lengthwise of said belt between said belt and abrasive means, said belt being provided on its upper surface with means forming a curving track engageable by eggs moved lengthwise of the belt for tilting the eggs during such movement.

2. An egg cleaning device comprising an egg supporting belt, a strand of flexible abrasive means extending generally parallel to and above said belt and spaced therefrom a distance less than the diameter of the eggs to be cleaned, means for moving said belt and strand in opposite directions, means for tilting said belt transversely during longitudinal movement thereof, and means for moving eggs lengthwise of said belt between said belt and abrasive means.

3. An egg cleaning device comprising an egg supporting belt, a strand of flexible abrasive means extending generally parallel to and above said belt and spaced therefrom a distance less than the diameter of the eggs to be cleaned, means for moving said belt and strand in opposite directions, means for raising one edge of said belt and simultaneously lowering the opposite edge and thereafter reversing such movement to tilt the belt back and forth during longitudinal movement thereof, and means for moving eggs lengthwise of said belt between said belt and abrasive means.

4. An egg cleaning device comprising an egg supporting belt, a strand of flexible abrasive means extending generally parallel to and above said belt and spaced therefrom a distance less than the diameter of the eggs to be cleaned, means for moving said belt and strand in opposite directions, longitudinally extending members located beneath said belt adjacent opposite edges thereof, means for alternately raising and lowering said members so as to tilt said belt back and forth transversely as it travels lengthwise of said members, and means for moving eggs lengthwise of said belt between said belt and abrasive means.

5. An egg cleaning device comprising an egg supporting and conveying belt, a plurality of flexible strands of abrasive material extending generally parallel to and above said belt and spaced therefrom a distance less than the diameter of the eggs to be cleaned, means for feeding eggs one at a time to said belt near one end thereof, means adjacent the opposite end of said belt for receiving eggs therefrom, egg engaging means movable longitudinally of said belt between said belt and strands, means for moving said belt in a direction from said egg feeding means toward said egg receiving means at a predetermined speed, means for raising one edge of said belt and simultaneously lowering the opposite edge and thereafter reversing such movement to tilt the belt back and forth during longitudinal movement thereof, means for moving said egg engaging means in the same direction as said belt but at a slower speed, and means for moving said strands in the opposite direction and at a higher speed than said belt.

6. An egg cleaning device comprising an egg supporting and conveying belt, a plurality of flexible strands of abrasive material extending generally parallel to and above said belt and spaced therefrom a distance less than the diameter of the eggs to be cleaned, means for feeding eggs one at a time to said belt near one end thereof, means adjacent the opposite end of said belt for receiving eggs therefrom, egg engaging means movable longitudinally of said belt between said belt and strands, means for moving said belt in a direction from said egg feeding means toward said egg receiving means at a predetermined speed, longitudinally extending members located beneath said belt adjacent opposite edges thereof, means for alternately raising and lowering said members so as to tilt said belt back and forth transversely as it travels lengthwise of said members, means for moving said egg engaging means in the same direction as said belt but at a slower speed, and means for moving said strands in the opposite direction and at a higher speed than said belt.

OTTO C. NIEDERER.
OTTO NIEDERER.
HERBERT O. NIEDERER.

REFERENCES CITED

The following references are of record in the file of this patent:

UNITED STATES PATENTS

| Number | Name | Date |
|---|---|---|
| 645,717 | Fletcher | Mar. 20, 1900 |
| 743,345 | Strutz | Nov. 3, 1903 |
| 1,995,382 | Fenton | Mar. 26, 1935 |
| 2,391,322 | Lundquist | Dec. 18, 1945 |
| 2,408,648 | Inman | Oct. 1, 1946 |
| 2,479,506 | Payton | Aug. 16, 1949 |